(No Model.)
T. R. FERRALL.
TRAWL ROLLER.
No. 272,870. Patented Feb. 27, 1883.
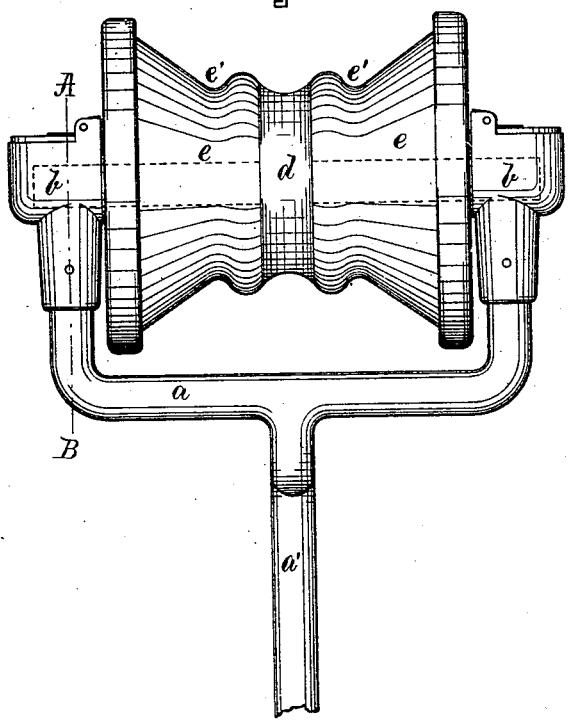
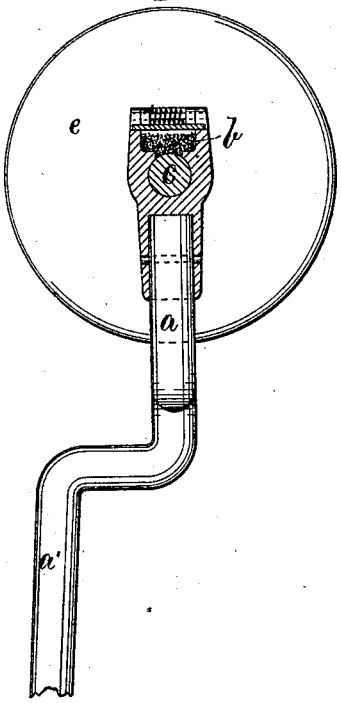
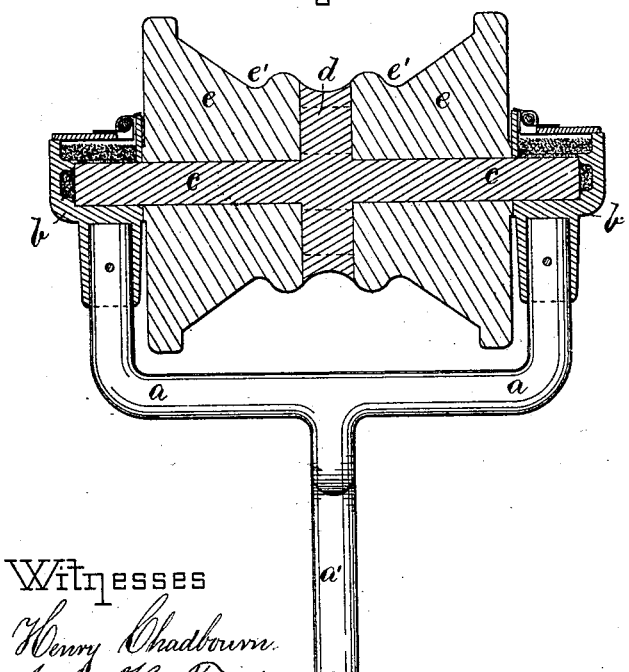
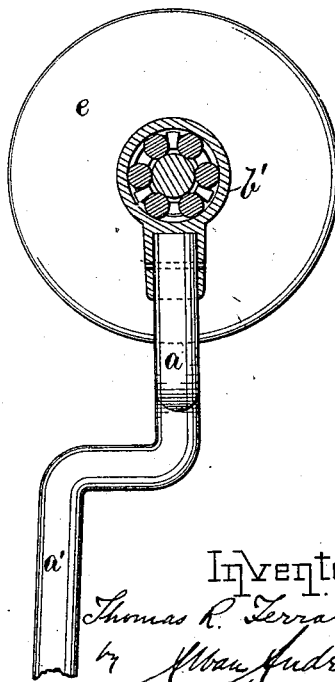
Witnesses
Henry Chadbourn
John H. Foster
Inventor
Thomas R. Ferrall
by Alban Andren
his atty.

UNITED STATES PATENT OFFICE.

THOMAS R. FERRALL, OF BOSTON, MASSACHUSETTS.

TRAWL-ROLLER.

SPECIFICATION forming part of Letters Patent No. 272,870, dated February 27, 1883.

Application filed November 1, 1882. (No model.)

*To all whom it may concern:*

Be it known that I, THOMAS R. FERRALL, a citizen of the United States, residing at Boston, in the county of Suffolk and State of Massachusetts, have invented certain new and useful Improvements in Trawl-Rollers; and I do hereby declare that the same are fully described in the following specification and illustrated in the accompanying drawings.

This invention relates to improvements in trawl-rollers, and it is carried out as follows, reference being had to the accompanying drawings, on which—

Figure 1 represents a side elevation. Fig. 2 represents a central longitudinal section. Fig. 3 represents a vertical section on the line A B, shown in Fig. 1. Fig. 4 represents one of the bearings as provided with anti-frictional rolls.

Similar letters refer to similar parts wherever they occur on the different parts of the drawings.

$a$ is the metal frame, with its downward-projecting shank $a'$ adapted to be inverted into a suitable socket or perforation in the railing of the boat.

$b\ b$ represent self-lubricating bearings, secured to the upper ends of the frame $a$. The bearings $b\ b$ (shown in Figs. 1, 2, and 3) will form the subject-matter for an application for a patent hereafter to be made.

Other bearings may be used with my improved trawl-roller without departing from the spirit of my invention—as, for instance, anti-frictional roller-bearings, as shown in Fig. 4 at $b'$, or any other form of bearings, as may be desirable.

$c$ represents the metal spindle, adapted to be supported and to run loosely in the bearings $b\ b$. To the middle portion of the spindle $c$ is secured the grooved trawl-roller $d$, which may be made of metal, hard rubber, or other suitable material; and if made of metal it may, if so desired, be made in one single piece with the spindle $c$.

On either side of the central trawl-roller, $d$, are secured to the spindle $c$ the conical trawl-rollers $e\ e$, which latter I prefer to make of lignum-vitæ or other hard wood, such rollers being each provided with an annular groove, $e'\ e'$, as shown in Figs. 1 and 2.

By making this my improved trawl-roller in three different parts—that is, a central one, $d$, and side rollers, $e\ e$, all secured to the spindle $c$—I am able to produce a very strong and durable trawl-roller from smaller pieces of lignum-vitæ, as compared with a continuous solid roller, and I am thus able to utilize pieces of wood that otherwise would be wasted; and if a portion of this my improved roller should get damaged or broken such injured part may easily be replaced with another at a small expense, as compared with an entire new roller.

Another advantage of my improved trawl-roller is that by securing it to the spindle $c$ and locating the bearings for said spindle outside of the roller, the latter will run very easily without much friction, as compared with rollers running loosely on a fixed spindle, which is the usual mode of making trawl-rollers.

What I wish to secure by Letters Patent and claim is—

In a trawl-roller, the central spindle, $c$, adapted to rotate loosely in the outer bearings $b\ b$, and having secured to it the grooved center roller, $d$, and side rollers, $e\ e$, as and for the purpose set forth and described.

In testimony whereof I have affixed my signature in presence of two witnesses.

THOMAS R. FERRALL.

Witnesses:
ALBAN ANDRÉN,
HENRY CHADBOURN.